(12) United States Patent
Lesage

(10) Patent No.: US 7,504,454 B2
(45) Date of Patent: Mar. 17, 2009

(54) PROCESS FOR THE PREPARATION OF BLOCK COPOLYMERS FOR TIRE TREAD COMPOSITIONS, AND THESE COPOLYMERS

(75) Inventor: Pierre Lesage, Clermont-Ferrand (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 337 days.

(21) Appl. No.: 11/267,260

(22) Filed: Nov. 7, 2005

(65) Prior Publication Data

US 2006/0148964 A1    Jul. 6, 2006

Related U.S. Application Data

(63) Continuation of application No. PCT/EP2004/004722, filed on May 4, 2004.

(30) Foreign Application Priority Data

May 7, 2003    (FR) .................... 03 05589

(51) Int. Cl.
 *C08K 3/04*    (2006.01)
(52) U.S. Cl. .................. 524/495; 525/314; 525/315
(58) Field of Classification Search ........... 524/495; 525/314, 315
See application file for complete search history.

(56) References Cited

U.S. PATENT DOCUMENTS

| | | | |
|---|---|---|---|
| 4,080,492 A | 3/1978 | de Zarauz |
| 4,092,268 A | 5/1978 | de Zarauz |
| 4,129,705 A | 12/1978 | de Zarauz |
| 5,017,636 A | 5/1991 | Hattori et al. |
| 5,134,199 A | 7/1992 | Hattori et al. |
| 5,916,957 A | 6/1999 | Itoh et al. |
| 6,133,376 A | 10/2000 | Hsieh et al. |
| 6,150,487 A | 11/2000 | Zhang et al. |
| 6,271,317 B1 | 8/2001 | Halasa et al. |
| 6,624,267 B1 | 9/2003 | Favrot et al. |
| 6,800,582 B2 | 10/2004 | Favrot et al. |
| 2003/0212223 A1 | 11/2003 | Favrot et al. |

FOREIGN PATENT DOCUMENTS

| | | | |
|---|---|---|---|
| EP | 0709235 A | | 5/1996 |
| EP | 0856522 A | | 8/1998 |
| EP | 1018521 A | | 7/2000 |
| GB | 1 293 074 | * | 10/1972 |
| GB | 1293074 A | | 10/1972 |
| GB | 1516861 A | | 7/1978 |
| GB | 1525381 A | | 9/1978 |
| GB | 2333298 A | | 7/1999 |
| JP | 01-135847 A | | 5/1989 |

OTHER PUBLICATIONS

Patent Abstracts of Japan, vol. 013, No. 388 (C-630), Aug. 28, 1989.

* cited by examiner

*Primary Examiner*—Robert D. Harlan
(74) *Attorney, Agent, or Firm*—Buchanan Ingersoll & Rooney PC

(57) ABSTRACT

A process for the preparation of a functionalized, coupled or starred block copolymer which is usable in a sulphur-cross-linkable rubber composition of reduced hysteresis in the cross-linked state, one at least of said blocks consisting of a polyisoprene and at least one other block consisting of a diene elastomer other than a polyisoprene the molar ratio of units originating from one or more conjugated dienes of which is greater than 15%. The process includes the steps of: copolymerization of one or more monomers comprising a conjugated diene other than isoprene using a catalytic system comprising at least one hydrocarbon solvent, a compound A of a metal of group IIIA, a compound B of an alkaline-earth metal and a polymer initiator C comprising a C—Li bond which is formed of a monolithiated polyisoprene intended to form the polyisoprene block, and addition to the product of the copolymerization of a functionalizing, coupling or starring agent comprising an acetoxy group and of formula $R_n$—Sn—(O—CO—R')$_{4-n}$, where n is a natural integer of from 0 to 4 and where R and R' are each alkyl, cycloalkyl, aryl or aralkyl groups which may be identical or different, so that said or each block formed of a diene elastomer other than a polyisoprene is functionalized, coupled or starred.

36 Claims, No Drawings

PROCESS FOR THE PREPARATION OF BLOCK COPOLYMERS FOR TIRE TREAD COMPOSITIONS, AND THESE COPOLYMERS

CROSS-REFERENCE TO RELATED APPLICATIONS

This application is a continuation of International Application No. PCT/EP2004/004722, filed May 4, 2004, published in French on Nov. 18, 2004 as WO 2004/099277, and claims priority based on French Application No. 03/05589, filed May 7, 2003, the disclosures of both applications being incorporated herein in their entirety.

BACKGROUND

The present invention relates to a process for the preparation of a functionalized, coupled or starred block copolymer which is usable in a sulphur-cross-linkable rubber composition of reduced hysteresis in the cross-linked state, to such a block copolymer and to a rubber composition incorporating it which is usable in a tire tread. The invention also relates to this tread and to a tire incorporating it having reduced rolling resistance.

DESCRIPTION OF RELATED ART

The tire industry is constantly endeavoring to reduce the hysteresis of mixes in order to limit fuel consumption and thus conserve the environment.

This reduction in hysteresis must be achieved while maintaining or even improving the processability of the mixes. Numerous approaches for reducing hysteresis have already been investigated. Chain end functionalization has appeared to be a particularly promising method.

Most of the proposed methods have involved seeking out adjacent functions on completion of polymerization which are capable of interacting with carbon black, for example contained in star polymers or tin-coupled polymers. European Patent Specification EP-A-709 235 may be mentioned by way of example. Other functions which interact with carbon black have also been attached to chain ends, such as 4,4'-bis(diethylaminobenzophenone), which is also known as DEAB, or other amine functions. Patent specifications FR-A-2 526 030 and U.S. Pat. No. 4,848,511 may be mentioned by way of example.

For some years, it has been possible to use silica and research has been under way to find functions capable of interacting with this filler. Patent specification FR-A-2 740 778, which discloses for example functions comprising a silanol group, may in particular be mentioned in this connection. Mention may also be made of specification U.S. Pat. No. 5,066,721, which discloses alkoxysilane or aryloxysilane functions, or alternatively specification U.S. Pat. No. 3,244,664.

Most of these solutions, whether for carbon black or for silica, bring about a genuine limitation of hysteresis and an increased level of reinforcement of the corresponding compositions. Unfortunately, it is also generally the case that these improvements result in greater difficulty in processing these compositions.

Other means of reducing hysteresis which do not affect the processing of the mixes have thus been sought.

In particular, using polymers with a low hysteresis potential, in particular polyisoprene, has appeared to be a promising approach. However, directly using this type of polymer does not always provide a satisfactory compromise between dynamic modulus and hysteresis.

In order to overcome this disadvantage, the attempt has been made to use block copolymers comprising a polyisoprene block.

Block copolymers are generally composed of materials in segregated phases. Diblock polyisoprene/polystyrene copolymers, the synthesis of which has been comprehensively described in the literature, may be mentioned by way of example. These diblock copolymers are known to exhibit valuable impact-resistance properties.

Block copolymers comprising polyisoprene and polybutadiene blocks (abbreviated to IR and BR respectively) have also been described in the literature.

Certain post-polymerization reactions convert these elastomers into thermoplastic materials. For example, when hydrogenating a triblock BR/IR/BR copolymer, the butadiene fraction forms a crystalline polyethylene, while the isoprene fraction gives rise to a rubbery ethylene/butylene-type material.

Hydrochlorination of these materials may also impart crystalline properties thereto.

Diblock IR/SBR copolymers (polyisoprene/copolymer of styrene and butadiene) have been described in European Patent Specification EP-A-438 967, in relation to a reinforcing filler specifically comprising carbon black. The number-average molecular weight of the IR block is preferably between 70,000 and 150,000 g/mol, while that of the SBR block is preferably between 220,000 and 240,000 g/mol. Furthermore, the ratio of the number-average molecular weight of the IR block to that of the SBR block must be greater than 33% and may be as much as 300%.

The rubber compositions described in this document may be of a variable structure, which is lamellar when said ratio is of the order of 33%, and spherical when said ratio is of the order of 300%.

However, for all these values of said ratio ranging from 33% to 300%, it should be noted that the relatively high number-average molecular weight of the IR block always results in marked segregation of the phases corresponding to the IR and SBR blocks respectively, owing to the high contents of 1,4-linkages in the IR block.

IR/BR block copolymers have also been considered as compatibilizing agents for blends of polyisoprene and polybutadiene.

The paper by D. J. Zanzig, F. L. Magnus, W. L. Hsu, A. F. Halasa, M. E. Testa, Rubber Chemistry and Technology vol. 66, pp. 538-549 (1993), which mentions the use of IR/BR block copolymers containing 80% or 50% IR, may be mentioned in this connection. At these relative contents, the number-average molecular weight of the IR block is always equal to or greater than 200,000 g/mol, and as a result the blocks of these copolymers also form segregated phases.

Mention may also be made in this connection of the paper by R. E. Cohen, A. R. Ramos, Macromolecules Vol. 12, No. 1, 131-134 (1979). In this paper, the diblock copolymers used comprise IR blocks of a number-average molecular weight of 104,000 g/mol, or of 133,000 g/mol. The relatively high molecular weight of the IR blocks and BR blocks also results in great segregation of the phases associated with these two blocks.

SUMMARY OF THE INVENTION

One aim of the present invention is to propose a process for the preparation of a functionalized, coupled or starred block copolymer which is usable in a sulphur-cross-linkable rubber composition, such as a tire tread composition, and which imparts to this composition a reduced hysteresis in the cross-linked state, this copolymer being such that one at least of its blocks is formed of a polyisoprene, at least one other block consisting of a diene elastomer other than a polyisoprene, the molar ratio of units originating from one or more conjugated dienes of which is greater than 15%. This object is achieved in that the Applicants have unexpectedly discovered that:

(i) the copolymerization of one or more monomers comprising at least one conjugated diene other than isoprene using a catalytic system comprising a hydrocarbon solvent, a compound A of a metal of group IIIA, a compound B of an alkaline-earth metal and a polymer initiator C comprising a C—Li bond which is formed of a monolithiated polyisoprene intended to form said polyisoprene block, and (ii) the addition to the product of this copolymerization of a functionalizing, coupling or starring agent comprising an acetoxy group of formula (1) $R_n$—Sn—(O—CO—R')$_{4-n}$, where n is a natural integer of from 0 to 4 and where R and R' are each alkyl, cycloalkyl, aryl or aralkyl groups which may be identical or different, so that said block formed of a diene elastomer other than a polyisoprene is functionalized, coupled or starred, makes it possible to prepare a functionalized, coupled or starred block copolymer which is usable in a sulphur-cross-linkable rubber composition for a tire tread comprising carbon black as reinforcing filler owing to the improved interaction of this copolymer with the carbon black, this copolymer according to the invention making it possible to optimize significantly for this composition, in the cross-linked state, the results of the reduction in hysteresis and, in the non-cross-linked state, the results of processing ability.

DETAILED DESCRIPTION OF THE INVENTION

In particular, taking as reference the hystereses relating to "control" diene elastomers the molar ratio of units originating from conjugated dienes of which is greater than 15%, for example styrene/butadiene copolymers (SBR) or IR/SBR block copolymers both of which are non-modified (i.e. neither functionalized, nor coupled, nor starred), a block copolymer according to the invention is characterized by a hysteresis which is more reduced than that relating to these "control" elastomers.

A diene elastomer the molar ratio of units originating from conjugated dienes of which is greater than 15% which is capable of forming said block other than said polyisoprene block is understood to mean any homopolymer obtained by polymerization of a conjugated diene monomer other than isoprene having 4 to 12 carbon atoms, or any copolymer obtained by copolymerization of one or more dienes conjugated together or with one or more vinyl aromatic compounds having from 8 to 20 carbon atoms.

Suitable conjugated dienes are, in particular, 1,3-butadiene, 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene and 2,4-hexadiene.

Suitable vinyl aromatic compounds are in particular styrene, ortho-, para- or meta-methylstyrene, the commercial mixture "vinyltoluene", para-tert. butylstyrene, methoxystyrenes and vinylmesitylene.

Advantageously, butadiene and a vinyl aromatic compound, such as styrene, are used as monomers to be copolymerized with the polyisoprene present in the lithiated initiator C, preferably for obtaining an IR and SBR block copolymer.

According to another characteristic of the invention, the or each block other than a polyisoprene has a content of trans-1,4 linkages equal to or greater than 70%.

According to another characteristic of the invention, the or each polyisoprene block (IR) of the copolymer according to the invention has a content of vinyl linkages (3,4 and 1,2) which is substantially between 1 and 20%.

According to another characteristic of the invention, said polyisoprene block(s) has(have) a number-average molecular weight $M_{n1}$ of between 2,500 and 20,000 g/mol, said block(s) formed of said diene elastomer having a number-average molecular weight $M_{n2}$ of between 65,000 and 350,000 g/mol.

It will be noted that this reduced molecular weight of the polyisoprene block(s) makes it possible not to reduce the modulus of the block copolymer obtained too significantly.

Preferably, the ratio of said number-average molecular weights $M_{n1}/M_{n2}$ is substantially between 5 and 20%.

As regards said catalytic system which is used to prepare the block copolymers according to the invention, mention may be made, as representative examples of said compounds A which are usable, of the following organometallic compounds:

organoaluminum compounds, whether halogenated or not, such as triethylaluminum, triisobutylaluminum, diethylaluminum chloride, ethylaluminum dichloride, ethylaluminum sesquichloride or methylaluminum sesquichloride; dialkylaluminum hydrides, such as diethylaluminum hydride and diisobutylaluminum hydride.

Preferably, a trialkylaluminum the number of carbon atoms of which is from 1 to 12, advantageously trioctylaluminum, is used for said compound A.

The following can particularly be used as compounds B: the hydrides $H_2Ba$ and $H_2Sr$, mono- or polyfunctional organic acid salts of formulae (R—COO)$_2$ Ba or Sr, $R_1$—(COO)$_2$ Ba or Sr, where R and $R_1$ are organic radicals (the first monovalent and the second divalent), the corresponding thioacids, mono- or polyfunctional alcoholates and the corresponding thiolates; mono- or polyfunctional phenates and the corresponding thiophenates; Ba or Sr hydroxyacid and phenolic acid salts and the corresponding thio-products; Ba or Sr β-diketonates such as the reaction products of Ba or Sr with acetylacetone, dibenzoylmethane, thenoyltrifluoroacetone, benzoyltrifluoroacetone or benzoylacetone; organic Ba or Sr derivatives such as those of 1,1-diphenylethylene, 1,2-acenaphthylene, tetraphenylbutane, α-methylstyrene, or alternatively those such as diphenylbarium or -strontium, bis (cyclopentadienyl)barium or -strontium, trialkylsilylbarium or -strontium, or triphenylsilylbarium or -strontium; mixed organic derivatives such as phenylbarium iodide, methylstrontium iodide, Ba or Sr salts of secondary amines; ketyl metals such as Ba or Sr benzophenone, Ba or Sr cinnamone and the corresponding alkylated products and the sulphurised homologues; radical ions of Ba and Sr such as those of naphthalene, anthracene, chrysene, diphenyl, etc.

It is also possible to use a calcium alcoholate for the compound B.

Preferably, a barium alcoholate, advantageously barium ethyl diglycolate or barium nonylphenoxide, is used for said compound B.

A non-functionalized monolithiated polyisoprene, that is to say, one which is devoid of any functional group such as carboxyl, amine, amide, etc., groups, and preferably obtained anionically is usable as polymer initiator C comprising a C—Li bond.

According to a first embodiment of the invention, this catalytic system according to the invention comprises a co-catalyst, resulting from the product of reaction in said hydrocarbon solvent of said compound A and said compound B, and said polymer initiator C.

According to a first example of embodiment of this first embodiment, the preparation process according to the invention consists of implementing the following steps:

in a first step, this co-catalyst is prepared by reacting the two compounds A and B in said inert hydrocarbon solvent. Then the mixture obtained is heated preferably to a temperature of between 20 and 120° C., even more preferably between 30 and 50° C., and for a time sufficient to permit the reaction of the two compounds A and B (generally between 1 and 60 min., preferably between 20 and 40 min.); then in a second step, said co-catalyst is contacted with the polymerization medium comprising said monomer(s) which is/are to be copolymerized (which are for example in solution in a polymerization solvent, in the case of copolymerization in solution), with the exclusion of said polymer initiator C; then in a third step, said initiator C is added to the polymerization medium thus obtained, so as to react the mixture obtained in said second step, then in a fourth step, said functionalizing, coupling or starring agent is added to the product of the copolymerization, and the functionalization, coupling or starring reaction is later stopped in order to obtain said functionalized, coupled or starred block copolymer.

According to a second example of embodiment of this first embodiment, the preparation process according to the invention then consists of implementing the following steps:

a first step which is the same as that described for said first example; then a second step which consists of adding said polymer initiator C to the premix obtained in the first step formed by compounds A and B, possibly after having added an alkyllithium compound to improve the activity of the catalytic system. Preferably, this alkyllithium compound is butyllithium; then a third step which consists of adding the catalytic system thus obtained to the polymerization medium comprising said monomer(s) to be copolymerized (which are for example in solution in a polymerization solvent, in the case of copolymerization in solution); then a fourth step which consists of adding said functionalizing, coupling or starring agent to the product of the copolymerization, and the functionalization, coupling or starring reaction is later stopped in order to obtain said functionalized, coupled or starred block copolymer.

The temperature conditions are the same as those of said first example.

According to a second embodiment of the invention, the catalytic system comprises a premix of said compounds A and C in said hydrocarbon solvent and said compound B.

This second embodiment is for example carried out in the following manner:

in a first step, a premix of said compounds A and C in said hydrocarbon solvent is produced, then in a second step, this premix is added to the polymerization medium comprising said monomer(s) to be copolymerized in solution in a polymerization solvent, then in a third step, said compound B is added to the mixture obtained in said second step, then in a fourth step, said functionalizing, coupling or starring agent is added to the product of the copolymerization, and the functionalization, coupling or starring reaction is later stopped in order to obtain said functionalized, coupled or starred block copolymer.

In these two embodiments of the preparation process according to the invention, a quantity of the reagents A and B is used such that the molar ratio A/B is of between 0.5 and 5, and preferably between 2.5 and 4. Furthermore, a quantity of the two reagents B and C is used which is such that the molar ratio C/B is of between 0.2 and 4, and preferably between 1.5 and 4.

In the case of copolymerization in solution, the polymerization solvent is preferably a hydrocarbon solvent, preferably cyclohexane, and the polymerization temperature is between 20 and 150° C., preferably between 60 and 110° C.

Furthermore, the concentration of alkaline-earth metal of the catalytic system according to the invention is between 0.01 and 0.5 mol.l$^{-1}$, preferably between 0.03 and 0.25 mol.l$^{-1}$.

It will be noted that the copolymerization according to the invention may be continuous or discontinuous and that it may also be effected without solvent.

With regard to the specific modifying functionalizing, coupling or starring agents which are usable for obtaining the modified block copolymers according to the invention with reference to said formula (1), it will be noted that the groups R and R' may comprise a variable number of carbon atoms which may for example be up to 22 (i.e. from 1 to 22 carbon atoms for the alkyl groups and from 6 to 22 for the cycloalkyl, aryl or aralkyl groups).

To obtain a functionalized block copolymer according to the invention (i.e. by definition at a single chain end), a functionalizing agent is used which corresponds to said formula (1) with n=3, i.e. $R_3$—Sn—(O—CO—R'), the copolymer obtained being linear with two blocks (e.g. IR/SBR).

Tributyl tin acetate may be mentioned as an example of a functionalizing agent usable according to the invention.

To obtain a coupled block copolymer according to the invention, a coupling agent in accordance with formula (1) is used with n=2, i.e. $R_2$—Sn—(O—CO—R')$_2$, this copolymer being linear with three blocks, the two end blocks consisting of a polyisoprene (e.g. IR/SBR/IR).

Preferably, the coupling agent used is dibutyl tin diacetate.

Other coupling agents satisfying formula (1) are also usable, such as dibutyl tin dilaurate or dibutyl tin distearate, in non-limitative manner.

To obtain a starred block copolymer according to the invention, a starring agent in accordance with formula (1) is used with n=0 or 1, i.e. Sn—(O—CO—R')$_4$ or $R_1$—Sn—(O—CO—R')$_3$, respectively for obtaining a branched copolymer with four or three branches, each branch comprising in both these cases two blocks, of which the end block is formed of a polyisoprene (e.g. four or three branches with SBR/IR blocks).

By way of example of such starring agents which are usable according to the invention, mention may be made of butyl tin triacetate (n=1) and tin tetraacetate (n=0).

Other starring agents which correspond to said formula (1), such as ethyl tin tristearate, butyl tin trioctanoate, butyl tin tristearate or butyl tin trilaurate are also usable, in non-limitative manner.

According to one preferred characteristic of the invention, the addition of said modifying agent is carried out such that the molar ratio Sn/Li (i.e. modifying agent/lithiated polyisoprene) is between 0.2 and 1 and, even more preferably, between 0.3 and 0.8.

In fact, tests carried out in the context of the present invention have shown that the "jump" or difference in inherent viscosity between the non-modified block copolymer and the modified (i.e. functionalized, coupled or starred) block copolymer, which constitutes a satisfactory indicator of the modification achieved on the copolymer, reaches an optimum when the value of this ratio Sn/Li lies within the aforementioned ranges.

A functionalized, coupled or starred block copolymer according to the invention, which is usable in a sulphur-cross-linkable rubber composition, of reduced hysteresis in the cross-linked state and comprising carbon black as reinforcing filler, one at least of said blocks consisting of a polyisoprene and at least one other block consisting of a diene elastomer other than a polyisoprene the molar ratio of units originating from one or more conjugated dienes of which is greater than 15%, is such that said block formed of a diene elastomer other than a polyisoprene is functionalized, coupled or starred by means of an agent comprising an acetoxy group of formula $R_n-Sn-(O-CO-R')_{4-n}$, where n is a natural integer of from 0 to 4 and where R and R' are each alkyl, cycloalkyl, aryl or aralkyl groups which are identical or different.

According to another characteristic of the invention, this functionalized, coupled or starred block copolymer is such that the or each block formed of a diene elastomer other than a polyisoprene has a trans-1,4 linkage content equal to or greater than 70%.

According to another characteristic of the invention, this functionalized, coupled or starred block copolymer is such that the polyisoprene block(s) has(have) a number-average molecular weight $M_{n1}$ of between 2,500 and 20,000 g/mol, and that said block(s) formed of said diene elastomer has (have) a number-average molecular weight $M_{n2}$ of between 65,000 and 350,000 g/mol.

According to one example of embodiment of the invention, this block copolymer is functionalized by means of said functionalizing agent according to the invention of the formula $R_3-Sn-(O-CO-R')$, such that said copolymer is linear with two blocks.

According to another example of embodiment of the invention, this block copolymer is coupled by means of said coupling agent according to the invention of formula $R_2-Sn-(O-CO-R')_2$, preferably dibutyl tin diacetate, such that said copolymer is linear with three blocks, the two end blocks each consisting of a polyisoprene.

According to another example of embodiment of the invention, this block copolymer is starred by means of said starring agent according to the invention of the formula $Sn-(O-CO-R')_4$ or $R_1-Sn-(O-CO-R')_3$, such that said copolymer is branched with four or three branches respectively, each branch comprising two blocks of which the end block is formed of a polyisoprene.

Preferably, a block copolymer according to the invention is such that the ratio of said number-average molecular weights $M_{n1}/M_{n2}$ is between 5 and 20%.

Preferably too, a block copolymer according to the invention is such that the diene elastomer forming said or each block other than a polyisoprene is a copolymer of butadiene and a vinyl aromatic compound, such as styrene.

Preferably too, a block copolymer according to the invention is such that said or each polyisoprene block has a content of 3,4 and 1,2 vinyl linkages which is substantially between 1 and 20%.

A rubber composition according to the invention comprises a reinforcing filler formed in its entirety or in part of carbon black and is such that it comprises said functionalized, coupled or starred block copolymer as defined previously, which makes this composition suitable, on one hand, to have improved processing ability in the non-cross-linked state and reduced hysteresis in the cross-linked state and, on the other hand, to constitute a tire tread having reduced rolling resistance.

Preferably, the composition according to the invention comprises this block copolymer in a quantity greater than 50 phr and possibly as much as 100 phr (phr: parts by weight per hundred parts of elastomer(s)) and, even more preferably, in a quantity of 100 phr.

Preferably, said reinforcing filler comprises in a majority proportion carbon black (i.e. in a weight fraction greater than 50%).

Preferably too, the reinforcing filler comprises carbon black in a quantity greater than 40 phr (phr: parts by weight per hundred parts of elastomer(s)).

As carbon black, there are suitable all the blacks which are commercially available or conventionally used in tires, and particularly in treads, in particular blacks of the type HAF, ISAF, SAF and preferably blacks of series 200 or 300. As non-limitative examples of such blacks, mention may be made of the blacks N234, N339, N347, N375, and also of the blacks of series 100 such as N115 and N134.

Of course, "carbon black" is also understood to mean a blend of different carbon blacks which is usable to form all or part of said reinforcing filler.

The reinforcing filler may furthermore comprise a reinforcing inorganic filler, preferably in a minority proportion (i.e. in a weight fraction of less than 50%).

In the present application, "reinforcing inorganic filler", in known manner, is understood to mean an inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition for tires, in other words which is capable of replacing a conventional tire-grade carbon black filler in its reinforcement function.

Preferably, all or at the very least a majority proportion of the reinforcing inorganic filler is silica ($SiO_2$). The silica used may be any reinforcing silica known to the person skilled in the art, in particular any precipitated or fumed silica having a BET surface area and a CTAB specific surface area both of which are less than 450 m$^2$/g, even if the highly dispersible precipitated silicas are preferred.

In the present specification, the BET specific surface area is determined in known manner, in accordance with the method of Brunauer, Emmett and Teller described in "The Journal of the American Chemical Society", vol. 60, page 309, February 1938, and corresponding to Standard AFNOR-NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomer matrix, which can be observed in known manner by electron or optical microscopy on thin sections. As non-limitative examples of such preferred highly dispersible silicas, mention may be made of the silica Perkasil KS 430 from Akzo, the silica BV3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminum-"doped" silicas described in patent specification EP-A-735088.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible silicas such as described above.

For example, black/silica blends or blacks partially or entirely covered with silica are suitable to form the reinforcing inorganic filler.

Also suitable as reinforcing inorganic fillers are carbon blacks modified by silica, such as the fillers sold by CABOT under the name "CRX 2000", which are described in patent specification WO-A-96/37547, aluminas (of formula $Al_2O_3$), such as the high-dispersibility aluminas which are described in European patent specification EP-A-810 258, or alternatively aluminum hydroxides, such as those described in international patent specification WO-A-99/28376.

The rubber composition according to the invention may furthermore comprise, in conventional manner, a reinforcing inorganic filler/elastomeric matrix bonding agent (also referred to as "coupling agent"), the function of which is to ensure sufficient chemical and/or physical bonding (or coupling) between the possible reinforcing inorganic filler and the matrix, while facilitating the dispersion of this inorganic filler within said matrix.

In known manner, in the presence of a reinforcing inorganic filler, it is necessary to use a coupling agent the function of which is to provide a sufficient chemical and/or physical connection between the inorganic filler (surface of its particles) and the elastomer.

Such a coupling agent, which is consequently at least bifunctional, has, for example, the simplified general formula "Y-T-X", in which:

Y represents a functional group ("Y" function) capable of bonding physically and/or chemically with the inorganic filler, such a bond being able to be established, for example, between a silicon atom of the coupling agent and the surface hydroxyl groups of the inorganic filler (e.g. surface silanols in the case of silica), X represents a functional group ("X" function) which is capable of bonding physically and/or chemically with the diene elastomer, i.e. via a sulphur atom, T represents a divalent group making it possible to link Y and X.

Any coupling agent likely to ensure, in the diene rubber compositions usable for the manufacturing of tire treads, the effective bonding between a reinforcing inorganic filler such as silica and a diene elastomer, in particular organosilanes or polyfunctional polyorganosiloxanes bearing the functions X and Y, may be used.

In particular polysulphurised silanes, which are referred to as "symmetrical" or "asymmetrical" depending on their specific structure, are used, such as those described for example in the patent documents FR 2 149 339, FR 2 206 330, U.S. Pat. Nos. 3,842,111, 3,873,489, 3,978,103, 3,997,581, 4,002,594, 4,072,701, 4,129,585, 5,580,919, 5,583,245, 5,650,457, 5,663,358, 5,663,395, 5,663,396, 5,674,932, 5,675,014, 5,684,171, 5,684,172, 5,696,197, 5,708,053, 5,892,085, EP 1 043 357, WO 02/083782.

Particularly suitable for implementing the invention, without the definition below being limitative, are what are called "symmetrical" polysulphurised silanes which satisfy the following general formula (I):

$$Z\text{-}A\text{-}S_n\text{-}A\text{-}Z, \text{ in which:} \quad (I)$$

n is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);

Z corresponds to one of the formulae below:

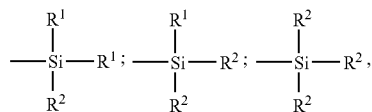

in which:

the radicals $R^1$, which may or may not be substituted, and may be identical or different, represent a $C_1$-$C_{18}$ alkyl group, a $C_5$-$C_{18}$ cycloalkyl group or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl), the radicals $R^2$, which may or may not be substituted, and may be identical or different, represent a $C_1$-$C_{18}$ alkoxyl group or a $C_5$-$C_{18}$ cycloalkoxyl group (preferably a group selected from among $C_1$-$C_8$ alkoxyls and $C_5$-$C_8$ cycloalkoxyls, more preferably still a group selected from among $C_1$-$C_4$ alkoxyls, in particular methoxyl and/or ethoxyl).

In the case of a mixture of polysulphurised alkoxysilanes in accordance with Formula (I) above, in particular conventional, commercially available, mixtures, the average value of the "n"s is a fractional number, preferably between 2 and 5, more preferably close to 4. However, the invention may also be implemented advantageously for example with disulphurised alkoxysilanes (n=2).

As examples of polysulphurised silanes, mention will be made more particularly of the polysulphides (in particular disulphides, trisulphides or tetrasulphides) of bis-(($C_1$-$C_4$) alkoxyl-($C_1$-$C_4$)alkylsilyl-($C_1$-$C_4$)alkyl), such as for example bis(3-trimethoxysilylpropyl) or bis(3-triethoxysilylpropyl) polysulphides. Of these compounds, in particular bis(3-triethoxysilylpropyl) tetrasulphide, abbreviated TESPT, of the formula $[(C_2H_5O)_3Si(CH_2)_3S_2]_2$, or bis(triethoxysilylpropyl) disulphide, abbreviated TESPD, of the formula $[(C_2H_5O)_3Si(CH_2)_3S]_2$, are used.

TESPD is sold, for example, by Degussa under the name Si75 (in the form of a mixture of disulphide—75% by weight—and of polysulphides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulphides having an average value of n which is close to 4).

Mention will also be made, as examples of advantageous coupling agent, of the polysulphides (in particular disulphides, trisulphides or tetrasulphides) of bis-(mono($C_1$-$C_4$) alkoxyl-di($C_1$-$C_4$)alkylsilylpropyl), more particularly bis-monoethoxydimethylsilylpropyl tetrasulphide as described in the aforementioned application WO 02/083782.

As examples of coupling agents other than the aforementioned polysulphurised alkoxysilanes, mention will be made in particular of the bifunctional polyorganosiloxanes such as described in the aforementioned applications WO99/02602 or WO01/96442, or alternatively the hydroxysilane polysulphides such as described in the aforementioned applications WO02/30939 and WO 02/31041.

The compositions according to the invention contain, in addition to the elastomeric matrix, said reinforcing filler and possibly a reinforcing inorganic filler/elastomer(s) bonding agent, all or some of the other additives usually used in rubber mixes, such as plasticisers, pigments, antioxidants, antiozone waxes, a cross-linking system based on either sulphur and/or peroxide and/or bismaleimides, cross-linking accelerators, extender oils, possibly one or more covering agents for the reinforcing inorganic filler, such as alkoxysilanes, polyols, amines, etc.

A tire tread according to the invention is such that it comprises a cross-linkable or cross-linked rubber composition such as defined above.

A tire according to the invention is such that it comprises this tread.

The aforementioned characteristics of the present invention, as well as others, will be better understood on reading the following description of several examples of embodiment of the invention, which are given by way of illustration and not of limitation.

In the examples below, the Mooney viscosity ML(1+4) at 100° C. is measured in accordance with Standard ASTM D 1646 of 1999, abbreviated to ML.

SEC (size exclusion chromatography) was used to determine the number-average molecular weights Mn of the copolymers obtained. According to this technique, the macromolecules are separated physically according to their respective sizes when swollen, in columns filled with a porous stationary phase.

A chromatograph sold under the name "WATERS" of model "150C" is used for the aforementioned separation. A set of two "WATERS" columns is used, the type being "STYRAGEL HT6E".

Furthermore, carbon-13 nuclear magnetic resonance ($^{13}$C-NMR) was used to determine the microstructure characteristics of the elastomers obtained. The details of this characterisation are explained below.

The $^{13}$C-NMR analyses are performed using a "Bruker AM250" spectrometer. The nominal frequency of carbon 13 is 62.9 MHz. To ensure quantitative results, the spectra are recorded without the "nuclear Overhauser effect" (NOE). The spectral width is 240 ppm. The angle pulse used is a 90° pulse the duration of which is 5 µs. Low-power decoupling with a wide proton band are used to eliminate scalar $^{1}$H—$^{13}$C coupling during $^{13}$C acquisition. The sequence repetition time is 4 seconds. The number of transients accumulated to increase the signal/noise ratio is 8192. The spectra are calibrated against the CDCl$_3$ band at 77 ppm.

The assay technique known as "near-infrared" (NIR), an indirect method using "control" elastomers the microstructure of which was measured by the $^{13}$C-NMR technique, was also used. The quantitative relationship (Beer-Lambert law) prevailing between the distribution of the monomers in an elastomer and the shape of the elastomer's NIR spectrum is exploited. This technique is carried out in two stages:

a) Calibration:

The respective spectra of the "control" elastomers are acquired.

A mathematical model is constructed which associates a microstructure to a given spectrum using the PLS (partial least squares) regression method, which is based on a factorial analysis of the spectral data. The following two documents provide a thorough description of the theory and practice of this "multi-variant" method of data analysis:

(1) P. GELADI and B. R. KOWALSKI

"Partial Least Squares regression: a tutorial",

Analytica Chimica Acta, vol. 185, 1-17 (1986).

(2) M. TENENHAUS

"La régression PLS—Théorie et pratique" Paris, Editions Technip (1998).

2) Measurement:

The spectrum of the sample is recorded.

The microstructure is calculated.

EXAMPLES

Coupled Copolymer A According to the Invention with Three Blocks IR/SBR/IR, Compared with Coupled "Control" Copolymers SBR B, C, D, E 1) Preparation of a Coupled Copolymer A with Three Blocks IR/SBR/IR According to the Invention Preparation of a Co-catalyst Included in a Catalytic System According to the Invention:

20 ml of cyclohexane, $3.8 \times 10^{-3}$ mol of barium ethyl diglycolate (component B in solution in cyclohexane) and $13.3 \times 10^{-3}$ mol of trioctylaluminum (component A in solution in cyclohexane) are introduced into a 0.25 l bottle which is kept under nitrogen. This mixture is stirred for 20 minutes at 40° C., and forms said co-catalyst.

Preparation of the Polymer Initiator C Formed of a Lithiated Polyisoprene:

154 ml of cyclohexane and 44 ml (30 g) of isoprene are introduced into a 0.25 l bottle which is kept under nitrogen. $3 \times 10^{-3}$ mol of s-BuLi is added and the polymerization is effected at 50° C. for 45 minutes. The lithiated polyisoprene of Mn=10,000 g/mol thus obtained is kept under nitrogen in a freezer at −20° C.

Copolymerization Using the Catalytic System According to the Invention:

Cyclohexane (154 ml), butadiene and styrene are introduced into a 0.25 l "control" bottle kept under nitrogen and into another, identical, bottle intended for implementing the invention, in the respective weight ratios 1/ 0.113/ 0.102. 0.62 ml of said co-catalyst (or 62.5 µmol of barium equivalent), then 147 µmol of said lithiated polyisoprene is added. The polymerization is carried out in each of the two bottles at 80° C., and the amount of monomer converted is 68% after 155 min. This amount is determined by weighing an extract dried at 110° C., at the reduced pressure of 200 mmHg.

In the "control" bottle containing the polymerization product, the latter is stopped with an excess of methanol relative to the lithium. The inherent viscosity measured ("initial" viscosity) is 1.39 dl/g.

Coupling Using a Coupling Agent According to the Invention:

A solution of dibutyl tin diacetate (59 µmol) is injected into the other bottle containing this same polymerization product. The ratio Sn/Li is therefore 0.40. After 15 minutes' reaction at 80° C., the coupling reaction is stopped with an excess of methanol relative to the lithium. The "final" inherent viscosity measured is 1.81 dl/g.

The viscosity jump, defined as the ratio of said "final" viscosity to said "initial" viscosity, here is 1.30. The viscosity ML of the polymer thus coupled is 55.

The copolymer A with three blocks IR/SBR/IR thus obtained is subjected to antioxidant treatment by addition of 0.35 parts per hundred parts of elastomers (phr) of 4,4'-methylene-bis-2,6-tert-butylphenol and 0.10 parts per hundred parts of elastomers (phr) of N-(1,3-dimethylbutyl)-N'-phenyl-p-phenylenediamine. This copolymer is recovered by drying in an oven at 60° C. in a stream of nitrogen.

The molecular weight Mn of this copolymer A, determined by the SEC technique, is 117,000 g/mol. The amount of residual free polyisoprene estimated by SEC is less than 2%.

The microstructure of this copolymer A is determined by $^{13}$C NMR:

the weight content of BR trans-1,4 is 79%, that of BR cis-1,4 is 16% and that of BR 1,2 is 5% (each of these three amounts relates to butadiene units);

the weight content of styrene is 28%;

the weight content of IR 3,4 units is 8%, that of the IR trans-1,4 units is 24% and that of the IR cis-1,4 units is 68% (these three amounts relate to the polyisoprene block).

Finally, the weight fraction of this IR block in this copolymer A is 8%.

2) Preparation of a "Control" SBR B Coupled Via Dibutyl Tin Diacetate:

This "control" SBR B is prepared by copolymerization of styrene and butadiene carried out in accordance with § 1) above, except for the fact that the copolymerization is initiated by means of n-butyllithium as lithiated initiator, instead of the aforementioned lithiated polyisoprene (the co-catalyst used being the same as previously).

Cyclohexane (154 ml), butadiene and styrene are introduced into a 0.25 l "control" bottle kept under nitrogen and into another, identical, bottle intended for implementing the coupling, in the respective weight ratios 1/ 0.108/ 0.100. 1.5 ml of said co-catalyst (or 150 μmol of barium equivalent), then 412 μmol of n-butyllithium is added. The polymerization is carried out in each of these two bottles at 80° C., and the amount of monomer converted is 59% after 18 min. This amount is determined by weighing an extract dried at 110° C., at the reduced pressure of 200 mmHg.

In the "control" bottle containing the product of the copolymerization, the latter is stopped with an excess of methanol relative to the lithium. The inherent viscosity measured ("initial" viscosity) is 1.07 dl/g.

A solution of dibutyl tin diacetate (125 μmol) is injected into the other bottle containing this same polymerization product. The ratio Sn/Li is therefore 0.30. After 15 minutes' reaction at 80° C., the coupling reaction is stopped with an excess of methanol relative to the lithium. The "final" inherent viscosity measured is 1.60 dl/g.

The viscosity jump ("final" viscosity/"initial" viscosity) here is 1.50.

The viscosity ML of the copolymer thus coupled is 51.

The SBR B obtained is subjected to the aforementioned antioxidant treatment and to the same drying operations as in § 1) above.

The molecular weight Mn of the copolymer B SBR obtained, determined by SEC, is 108,000 g/mol.

The microstructure of this "control" copolymer B is determined by near-infrared spectroscopy (NIR):

the weight content of BR trans-1,4 is 85%, that of BR cis-1,4 is 12% and that of BR 1,2 is 3% (each of these three amounts relates to butadiene units).

The weight content of styrene is 30%.

3) Preparation of a "Control" SBR C Coupled Via Dichlorodibutyl Tin:

This "control" SBR C is prepared by copolymerization of styrene and butadiene carried out in accordance with section § 2) above, except for the fact that the coupling agent used is dichlorodibutyl tin, i.e. not in accordance with the present invention (the co-catalyst used being the same as previously).

Cyclohexane (154 ml), butadiene and styrene are introduced into a 0.25 l bottle kept under nitrogen and into another, identical, bottle intended for implementing the coupling, in the respective weight ratios 1/ 0.108/ 0.100. 1 ml of said co-catalyst (or 100 μmol of barium equivalent), then 275 μmol of n-butyllithium is added. The polymerization is carried out in each of these two bottles at 80° C., and the amount of monomer converted is 53% after 15 min. This amount is determined by weighing an extract dried at 110° C., at the reduced pressure of 200 mmHg.

In the "control" bottle containing the product of the copolymerization, the latter is stopped with an excess of methanol relative to the lithium. The inherent viscosity measured ("initial" viscosity) is 1.28 dl/g.

A solution of dichlorodibutyl tin (200 μmol) is injected into the other bottle containing the same copolymerization product. The ratio Sn/Li is therefore 0.73. After 15 minutes' reaction at 80° C., the coupling reaction is stopped with an excess of methanol relative to the lithium. The inherent viscosity measured ("final" viscosity) is 1.49 dl/g.

The viscosity jump ("final" viscosity/"initial" viscosity), is only 1.16 (in comparison with the viscosity jump of 1.50 obtained in § 2) for the SBR B coupled with a coupling agent according to the invention consisting of dibutyl tin diacetate).

The SBR C obtained is subjected to the aforementioned antioxidant treatment and to the same drying operations.

The microstructure of this "control" SBR C is determined by near-infrared spectroscopy (NIR):

the weight content of BR trans-1,4 is 85%, that of BR cis-1,4 is 12% and that of BR 1,2 is 3% (each of these three amounts relates to butadiene units).

The weight content of styrene is 30%.

4) Preparation of a "Control" SBR D Coupled Via Dichlorodimethyl Tin:

This "control" SBR D is prepared by copolymerization of styrene and butadiene carried out in accordance with § 2) above, except for the fact that the coupling agent used is dichlorodimethyl tin, i.e. not in accordance with the invention (the co-catalyst used being the same as previously).

Cyclohexane (154 ml), butadiene and styrene are introduced into a 0.25 l bottle kept under nitrogen and into another, identical, bottle intended for implementing the coupling, in the respective weight ratios 1/ 0.108/ 0.100. 1 ml of said co-catalyst (or 100 μmol of barium equivalent), then 275 μmol of n-butyllithium is added. The polymerization is carried out in each of these two bottles at 80° C., and the amount of monomer converted is 68% after 30 min. This amount is determined by weighing an extract dried at 110° C., at the reduced pressure of 200 mmHg.

In the "control" bottle containing the product of the copolymerization, the latter is stopped with an excess of methanol relative to the lithium. The inherent viscosity measured ("initial" viscosity) is 1.29 dl/g.

A solution of dichlorodimethyl tin (200 μmol) is injected into the other bottle containing the same copolymerization product. The ratio Sn/Li is therefore 0.73. After 15 minutes' reaction at 80° C., the coupling reaction is stopped with an excess of methanol relative to the lithium. The inherent viscosity measured ("final" viscosity) is 1.44 dl/g.

The viscosity jump ("final" viscosity/"initial" viscosity) is only 1.12 (in comparison with the viscosity jump of 1.50 obtained in § 2) for the SBR B coupled with a coupling agent according to the invention consisting of dibutyl tin diacetate).

The SBR D obtained is subjected to the aforementioned antioxidant treatment and to the same drying operations.

The microstructure of this "control" copolymer D is determined by near-infrared spectroscopy:

the weight content of BR trans-1,4 is 85%, that of BR cis-1,4 is 12% and that of BR 1,2 is 3% (each of these three amounts relates to butadiene units).

The weight content of styrene is 30%.

5) Preparation of a "Control" SBR E Coupled Via Dichlorodiphenyl Tin:

This "control" SBR E is prepared by copolymerization of styrene and butadiene carried out in accordance with § 2)

above, except for the fact that the coupling agent used is dichlorodiphenyl tin, i.e. which is not in accordance with the invention (the co-catalyst used being the same as previously).

Cyclohexane (154 ml), butadiene and styrene are introduced into a 0.25 l "control" bottle kept under nitrogen and into another, identical, bottle intended for implementing the coupling, in the respective weight ratios 1/0.108/0.100. 1 ml of said co-catalyst (or 100 μmol of barium equivalent), then 275 μmol of n-butyllithium is added. The polymerization is carried out in each of these two bottles at 80° C., and the amount of monomer converted is 60% after 28 min. This amount is determined by weighing an extract dried at 110° C., at the reduced pressure of 200 mmHg.

In the "control" bottle containing the product of the copolymerization, the latter is stopped with an excess of methanol relative to lithium. The inherent viscosity measured ("initial" viscosity) is 1.33 dl/g.

A solution of dichlorodiphenyl tin (200 μmol) is injected into the other bottle containing this same polymerization product. The ratio Sn/Li is therefore 0.73. After 15 minutes' reaction at 80° C., the coupling reaction is stopped with an excess of methanol relative to the lithium. The inherent viscosity measured ("final" viscosity) is 1.50 dl/g.

The viscosity jump ("final" viscosity/"initial" viscosity) is here 1.13 (in comparison with the viscosity jump of 1.50 obtained in § 2) for the SBR B coupled with a coupling agent according to the invention consisting of dibutyl tin diacetate).

The SBR E obtained is subjected to the aforementioned antioxidant treatment and to the same drying operations.

The microstructure of this "control" copolymer E is determined by near-infrared spectroscopy:

the weight content of BR trans-1,4 is 85%, that of BR cis-1,4 is 12% and that of BR 1,2 is 3% (each of these three amounts relates to butadiene units).

The weight content of styrene is 30%.

The invention claimed is:

1. A process for the preparation of a functionalized, coupled or starred block copolymer which is usable in a sulphur-cross-linkable rubber composition comprising carbon black and of reduced hysteresis in the cross-linked state, one at least of said blocks consisting of a polyisoprene and at least one other block consisting of a diene elastomer other than a polyisoprene the molar ratio of units originating from one or more conjugated dienes of which is greater than 15%, wherein said process comprises:
   (i) copolymerization of one or more monomers comprising at least one conjugated diene other than isoprene using a catalytic system comprising a hydrocarbon solvent, a compound A of a metal of group IIIA, a compound B of an alkaline-earth metal and a polymer initiator C comprising a C—Li bond which is formed of a monolithiated non-functionalized polyisoprene intended to form said polyisoprene block, and
   (ii) addition to the product of said copolymerization of a functionalizing, coupling or starring agent comprising an acetoxy group of the formula $R_n$—Sn—(O—CO—R')$_{4-n}$, where n is a natural integer of from 0 to 4 and where R and R' are each alkyl, cycloalkyl, aryl or aralkyl groups which are identical or different, so that said block formed of a diene elastomer other than a polyisoprene is functionalized, coupled or starred.

2. The process for the preparation of a functionalized, coupled or starred block copolymer according to claim 1, wherein said each block formed of a diene elastomer other than a polyisoprene has a trans-1,4 linkage content equal to or greater than 70%.

3. The process for the preparation of a functionalized, coupled or starred block copolymer according to claim 1, wherein said polyisoprene block(s) has(have) a number-average molecular weight $M_{n1}$ of between 2,500 and 20,000 g/mol, said block(s) formed of said diene elastomer having a number-average molecular weight $M_{n2}$ of between 65,000 and 350,000 g/mol.

4. The process for the preparation of a functionalized block copolymer according to claim 1, wherein the addition of said functionalizing agent which satisfies the formula $R_3$—Sn—(O—CO—R') with n=3, forms a linear copolymer with two blocks.

5. The process for the preparation of a coupled block copolymer according to claim 1, wherein the addition of said coupling agent which satisfies the formula $R_2$—Sn—(O—CO—R')$_2$ with n=2, forms a linear copolymer with three blocks, the two end blocks of which each consisting of a polyisoprene.

6. The process for the preparation of a coupled block copolymer according to claim 5, wherein said coupling agent is dibutyl tin diacetate.

7. The process for the preparation of a starred block copolymer according to claim 1, wherein the addition of said starring agent which satisfies the formula Sn—(O—CO—R')$_4$ or R—Sn—(O—CO—R')$_3$ with n=0 or 1, respectively forms a branched copolymer with four or three branches, each branch comprising two blocks of which the end block is formed of a polyisoprene.

8. The process for the preparation of a functionalized, coupled or starred block copolymer according to claim 1, wherein the addition of said functionalizing, coupling or starring agent is carried out such that the molar ratio Sn/Li is between 0.2 and 1.

9. The process for the preparation of a functionalized, coupled or starred block copolymer according to claim 1, wherein the ratio of said number-average molecular weights $M_{n1}/M_{n2}$ is between 5 and 20%.

10. The process for the preparation of a functionalized, coupled or starred block copolymer according to claim 1, wherein said catalytic system comprises a co-catalyst, resulting from the product of reaction in said hydrocarbon solvent of said compound A and said compound B, and said polymer initiator C.

11. The process for the preparation of a functionalized, coupled or starred block copolymer according to claim 10, wherein it comprises:
   in a first step, preparing said co-catalyst by reacting said metal compounds A and B with each other in said hydrocarbon solvent,
   in a second step, contacting said co-catalyst with the polymerization medium comprising said monomer(s) which is/are to be copolymerized in solution in a polymerization solvent, with the exclusion of said polymer initiator C,
   in a third step, reacting the mixture obtained in said second step by means of said polymer initiator C,
   in a fourth step, adding said functionalizing, coupling or starring agent to the product of the copolymerization,
   and stopping the functionalization, coupling or starring reaction in order to obtain said functionalized, coupled or starred block copolymer.

12. The process for the preparation of a functionalized, coupled or starred block copolymer according to claim 10, wherein it comprises:
   in a first step, preparing said co-catalyst by reacting said metal compounds A and B with each other in said hydrocarbon solvent, in a second step, adding said polymer initiator C to the co-catalyst obtained in the first step, in a third step, adding the catalytic system thus obtained to the polymerization medium comprising said monomer(s) to be copolymerized in solution in a polymerization solvent, in a fourth step, adding said functionalizing, coupling or starring agent to the product of the copolymerization, and stopping the functionalization, coupling or starring reaction in order to obtain said functionalized, coupled or starred block copolymer.

13. The process for the preparation of a functionalized, coupled or starred block copolymer according to claim 1, wherein it comprises:

in a first step, preparing a premix of said compounds A and C in said hydrocarbon solvent, then in a second step, adding this premix to the polymerization medium comprising said monomer(s) to be copolymerized in solution in a polymerization solvent, in a third step, adding said compound B to the mixture obtained in said second step, in a fourth step, adding said functionalizing, coupling or starring agent to the product of the copolymerization, and stopping the functionalization, coupling or starring reaction in order to obtain said functionalized, coupled or starred block copolymer.

14. The process for the preparation of a functionalized, coupled or starred block copolymer according to claim 1, wherein said compound A is a trialkylaluminum, the number of carbon atoms of which varies from 1 to 12.

15. The process for the preparation of a functionalized, coupled or starred block copolymer according to claim 1, wherein said compound B is an alcoholate of barium, strontium or calcium.

16. The process for the preparation of a functionalized, coupled or starred block copolymer according to claim 11, wherein said first step comprises the production of a premix of said compounds A and B in said hydrocarbon solvent such that the molar ratio A/B is between 0.5 and 5, then heating said premix to a temperature of between 20° C. and 120° C.

17. The process for the preparation of a functionalized, coupled or starred block copolymer according to claim 1, wherein said hydrocarbon solvent comprises toluene and/or cyclohexane.

18. The process for the preparation of a functionalized, coupled or starred block copolymer according to claim 1, wherein the molar ratio compound C/compound B is between 0.2 and 4.

19. The process for the preparation of a functionalized, coupled or starred block copolymer according to claim 1, wherein said diene elastomer forming said or each block other than a polyisoprene is a copolymer of butadiene and a vinyl aromatic compound.

20. A functionalized, coupled or starred block copolymer which is usable in a sulphur-cross-linkable rubber composition comprising carbon black as reinforcing filler and of reduced hysteresis in the cross-linked state, one at least of said blocks consisting of a polyisoprene and at least one other block consisting of a diene elastomer other than a polyisoprene, the molar ratio of units originating from one or more conjugated dienes of which is greater than 15%, wherein said block formed of a diene elastomer other than a polyisoprene is functionalized, coupled or starred by means of an agent comprising an acetoxy group of formula $R_n$—Sn—(O—CO—R')$_{4-n}$, where n is a natural integer of from 0 to 4 and where R and R' are each alkyl, cycloalkyl, aryl or aralkyl groups which are identical or different.

21. The functionalized, coupled or starred block copolymer according to claim 20, wherein said or each block formed of a diene elastomer other than a polyisoprene has a trans-1,4 linkage content equal to or greater than 70%.

22. The functionalized, coupled or starred block copolymer according to claim 20, wherein said polyisoprene block(s) has(have) a number-average molecular weight $M_{n1}$ of between 2,500 and 20,000 g/mol, and in that said block(s) formed of said diene elastomer has/have a number-average molecular weight $M_{n2}$ of between 65,000 and 350,000 g/mol.

23. The functionalized block copolymer according to claim 20, wherein said functionalizing agent satisfies the formula $R_3$—Sn—(O—CO—R'), such that said copolymer is linear with two blocks.

24. The coupled block copolymer according to claim 20, wherein said coupling agent is of formula $R_2$—Sn—(O—CO—R')$_2$, such that said copolymer is linear with three blocks, the two end blocks each consisting of a polyisoprene.

25. The coupled block copolymer according to claim 24, wherein said coupling agent is dibutyl tin diacetate.

26. The starred block copolymer according to claim 20, wherein said starring agent is of the formula Sn—(O—CO—R')$_4$ or $R_1$—Sn—(O—CO—R')$_3$, respectively to obtain a branched copolymer with four or three branches, each branch comprising two blocks of which the end block is formed of a polyisoprene.

27. The functionalized, coupled or starred block copolymer according to claim 20, wherein the ratio of said number-average molecular weights $M_{n1}/M_{n2}$ is between 5 and 20%.

28. The functionalized, coupled or starred block copolymer according to claim 20, wherein said diene elastomer forming said or each block other than a polyisoprene is a copolymer of butadiene and a vinyl aromatic compound.

29. The functionalized, coupled or starred block copolymer according to claim 20, wherein each polyisoprene block has a content of 3,4 and 1,2 vinyl linkages which is between about 1 and 20%.

30. A cross-linkable or cross-linked rubber composition, having a reduced hysteresis in the cross-linked state and usable to form a tire tread, said composition comprising a reinforcing filler formed at least in part of carbon black, wherein it comprises a functionalized, coupled or starred block copolymer according to claim 20.

31. The rubber composition according to claim 30, wherein it comprises said block copolymer in a quantity greater than 50 phr and as much as 100 phr.

32. The rubber composition according to claim 31, wherein it comprises said block copolymer in a quantity of 100 phr.

33. The rubber composition according to claim 30, wherein said reinforcing filler comprises carbon black in a majority proportion.

34. The rubber composition according to claim 30, wherein said reinforcing filler comprises carbon black in a quantity greater than 40 phr.

35. A tire tread usable for reducing the rolling resistance of a tire incorporating same, wherein it comprises a rubber composition according to claim 30.

36. A tire having reduced rolling resistance, wherein it comprises a tread according to claim 35.

* * * * *